United States Patent [19]

Elias et al.

[11] 4,314,313

[45] Feb. 2, 1982

[54] SINGLE AND DUAL LOW INDUCTANCE CAPACITOR AND HEADER THEREFOR

[75] Inventors: William H. Elias, Six Mile; Harold M. Granger, Greenville, both of S.C.

[73] Assignee: Sangamo Weston, Inc., Norcross, Ga.

[21] Appl. No.: 74,175

[22] Filed: Sep. 10, 1979

[51] Int. Cl.$^3$ .............................................. H01G 9/00
[52] U.S. Cl. ...................................... 361/433; 29/570
[58] Field of Search .................. 361/433, 271; 29/570

[56] References Cited

U.S. PATENT DOCUMENTS

| 3,806,770 | 4/1974 | Voyles et al. | 361/433 |
|---|---|---|---|
| 3,971,970 | 7/1976 | Voyles et al. | 361/433 |
| 3,978,377 | 8/1976 | Constanti | 361/433 |
| 3,988,650 | 10/1976 | Fritze | 361/433 |
| 4,001,656 | 1/1977 | Voyles | 361/433 |
| 4,009,425 | 2/1977 | Muranaka et al. | 361/433 |
| 4,097,916 | 6/1978 | Piper | 361/433 |

*Primary Examiner*—Andrew J. James
*Attorney, Agent, or Firm*—Mikio Ishimaru; Dale V. Gaudier

[57] ABSTRACT

A capacitor which includes a case containing a capacitor element with multiple tabs extending therefrom is provided with a header which carries a pair of terminal members. Each of the terminal members has a pair of parallel connector leads extending out of the header connected by terminal portions inside the case. Each of the terminal portions includes portions parallel and nonparallel to corresponding terminal portions of the other terminal member and each of the tabs is welded to the outside of a parallel terminal portion.

28 Claims, 3 Drawing Figures

FIG. 2
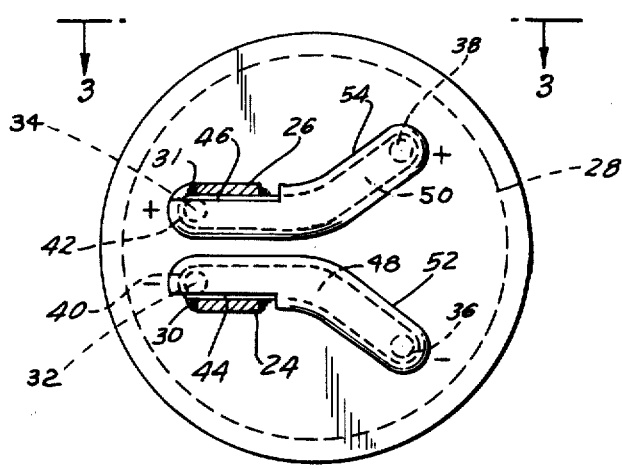
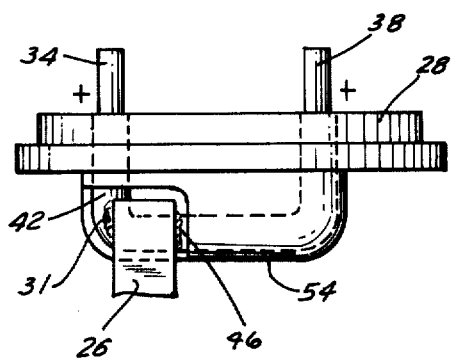
FIG. 3

SINGLE AND DUAL LOW INDUCTANCE CAPACITOR AND HEADER THEREFOR

BACKGROUND OF THE INVENTION

The present invention relates generally to minimizing impedance in capacitors and more particularly to low resistance, low inductance capacitors having low manufacturing costs and high capacitance to volume ratios.

All capacitors have series equivalent circuits with impedance consisting of capacitance, resistance, and inductance parameters, and conventional electrolytic capacitors have resonant frequencies between 5 and 100 kilohertz depending on size, voltage rating, and construction. At frequencies below the resonant frequency, the capacitor impedance is primarily affected by the capacitance and is minimized by maximizing capacitance. While the total resistance effect, or equivalent series resistance (ESR), has minimal influence on the impedance except at frequencies near the resonant frequency, the effect of ESR is noticeable in heat generation at all frequencies. The effect of the ESR is minimized by minimizing the ESR. Above the resonant frequency, the capacitor impedance is primarily affected by the total inductance, or equivalent series inductance (ESL) and is minimized by minimizng the ESL.

In the past, the capacitors used in conventional D.C. power supplies, which rectified 60 hertz line voltage to supply the desired D.C. level operated in ranges below the resonant frequency and the effects of the ESR and ESL were minimal. With the increased acceptance of switching regulated D.C. power supplies which operate at frequencies between 10 and 100 kilohertz (with resulting 20 to 200 kilohertz ripple and harmonics), new low ESR and ESL capacitors are required because normal operation is in ranges at or above the resonant frequencies.

Various other capacitors have been developed having relatively low ESR's and low ESL's such as those shown in the Puppolo, et al, U.S. Pat. No. 3,822,397 and the Voyles, et al, U.S. Pat. No. 3,806,770. However, since the terminals have not been side by side, or juxtapositioned, along their entire lengths inside the case, significant impedance still occurs in these type capacitors. Further, the split terminal cover design of the Puppolo patent and the tantalum capacitor design of the Voyles patent are expensive to manufacture and have low capacitance to volume ratios.

Also, in switching regulated power supplies with previous capacitors, additional capacitors having higher ESL's were required to filter out the 20 to 200 kilohertz ripple and harmonics fed to the load and from the switching regulator back into the main 60 hertz power supply line.

SUMMARY OF THE INVENTION

The present invention provides a capacitor and header in which the header carries a pair of spaced apart terminal members which have fully interactive electromagnetic fields when carrying current. Each of the terminal members is provided with an input and an output connector lead which are interconnected by parallel and nonparallel terminal portions respectively parallel and nonparallel to corresponding terminal portions on the other terminal portion.

The present invention further provides that by proximally spacing and juxtapositioning the output connector leads and the parallel terminal portions, and by welding the flat portions of the capacitor element tabs in parallel to the parallel terminal portions, the related electromagnetic fields in this area can be made to neutralize each other resulting in a surprising four fold reduction in ESL at the output connector leads.

An unexpected side effect of the tabs to terminal member connection was that the ESR was significantly reduced. Hindsight evaluation showed that, by making side welds to lower ESL in the small gap between the capacitor element and the header, the conventional long tabs required for bottom welding the tabs to the connector leads could be eliminated. While the difference in the length of the tabs was initially not considered significant, testing of the capacitor showed an unexpected, significant effect on ESR in addition to the substantial effect on ESL.

While the most intensive evaluation and testing was directed at improving the capacitor for operation in the switching regulated power supply, the question arose whether it would be possible to improve the power supply by changes in the capacitor. It was found that, by causing a portion of the terminal members (the nonparallel terminal portions) to diverge toward the input connector leads, it is possible to control the ESL so that the single capacitor of the present invention has two different ESL's depending on the direction of the power input.

The power from the main power line can now be fed through the capacitor's input connector leads and out the output connector leads to the switching regulated power supply with a minimal ESL while the undesirable ripple and harmonics fed back from the switching regulated power supply are filtered out and prevented from reaching the main power line from the output to the input connector leads because of the higher ESL. Similarly, pulsed power from the switching regulated power supply to the load can be supplied with the minimal ESL and filtered by the higher ESL. Thus, filter capacitors may be eliminated from the overall power supply, reducing its cost.

An additional side effect of having four connector leads with two spaced together and two spaced apart is that a generally tripodal configuration is achieved which provides greater mounting stability on printed circuit boards. The ends of the tripodal configuration connector leads define three points of a plane which can be matched to the plane of the circuit board.

An additional side effect inside the capacitor is that the parallel and nonparallel terminal portions effectively extend radially outward from the center of the header so that substantially covering them with the material of the header allows the terminal portions to provide the dual functions of rigidizing the header while providing interiorly extending ribs which engage the capacitor element to prevent radial movement thereof when subject to vibration.

Since it is necessary that the connector leads be solderable to printed circuit boards without the need for special welding equipment, the terminal members may be made of copper, or aluminum with a suitable plating.

The above and additional advantages of the present invention will become apparent to those skilled in the art from a consideration of the following detailed description of the preferred embodiment when taken in conjunction with the accompanying drawings.

DESCRIPTION OF THE DRAWINGS

FIG. 2 shows a portion of the present invention taken along line 2—2 of FIG. 1; and FIG. 3 shows a portion of the present invention taken along line 3—3 of FIG. 2.

DESCRIPTION OF THE PREFERRED EMBODIMENT

Figure 1:
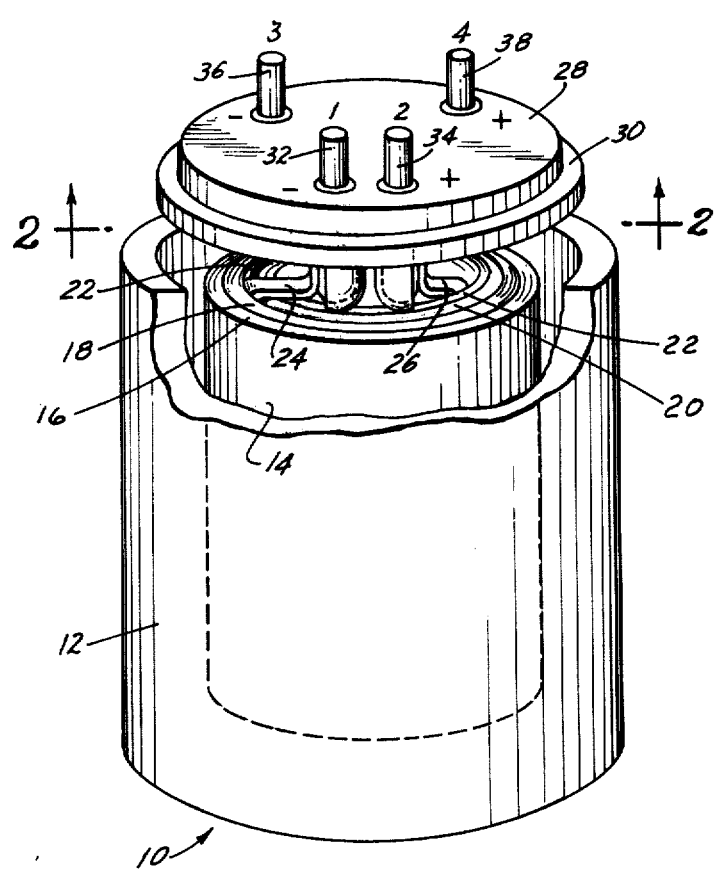
FIG. 1 is an isometric view, partially in section, of a capacitor embodying the present invention.

Referring now to FIG. 1, therein is shown an electrolytic capacitor 10 havng a capacitor case 12 which contains a capacitor element 14.

The capacitor element 14 is made up of a first spacer film 16 abutting and encircling a first electrode film 18 which in turn encircles and abutts a second spacer film 20. The second spacer film 20 further encircles and abutts a second electrode film 22. The first and second spacer films 16 and 20 are saturated in a conventional manner with a conventional capacitor electrolyte.

The first electrode film 18, the cathode, has a first tab 24 electrically conductively abutting it and extending from it towards the open end of the capacitor case 12. Similarly, the second electrode film 22, the anode, has a second tab 26 electrically conductively and abutting it and extending therefrom. The first and second tabs 24 and 26 are flat, rectangular shaped pieces of a conductive material, such as aluminum, which are deformable as well as weldable.

The capacitor case 12 is sealed by a header 28 (shown removed) which is made of a nonconductive moldable material in the preferred embodiment. As evident to those skilled in the art, the header can be made of a conductive material such as aluminum if proper insulation for the anode parts is provided.

The header 28 is held in place, to seal off the open end of the capacitor case 12, by being inserted in the capacitor case 12 and then having the case's edge rolled over a rim on the header 28 to prevent outward movement thereof.

Also shown in FIG. 1 are a pair of parallel output connector leads 32 and 34 which are proximally spaced and a pair of parallel input connector leads 36 and 38 which are distally spaced. These leads will be described in greater detail later.

Referring now to FIG. 2, therein is shown the header 28 as seen from inside of the capacitor case 12. The first and second tabs 24 and 26 are shown respectively welded by welds 30 and 31 to respective first and second terminal members 40 and 42. The first and second terminal members have respective parallel terminal portions 44 and 46 which are spaced apart and parallel, and nonparallel terminal portions 48 and 50 which are spaced apart and nonparallel. The nonparallel terminal portions 48 and 50 diverge toward their respective connections to the input connector leads 48 and 50.

Also seen in FIG. 2 are respective header ribs 52 and 54 which are extensions of the header material around the portion of the first and second terminal members 40 and 42 which are inside of the capacitor case 12. It will be noted that the header ribs 52 and 54 do not extend completely over the parallel terminal portions 44 and 46 respectively so that the first and second tabs 24 and 26 may be respectively welded in parallel directly to the case proximal sides of the terminal members.

Referring now to FIG. 3, therein may be seen the second terminal member 42 with the second tab 26 affixed by weld 31 on to the case-proximate-surface of the parallel terminal portion 46. Also therein may be seen the integral output and input connector leads 34 and 38 which are portions of the second terminal member 42. Similarly, the output and input connector leads 32 and 36 are integral portions of the first terminal member 40.

In the preferred embodiment, the terminal members are made of aluminum while the connector leads may be solid copper but are preferably splash-coated with copper. The reason for copper is that while aluminum is inexpensive compared to copper, it can only be welded and cannot be soldered as required in most customer electrical applications. Thus, the required connection of the tabs can be done in the factory during manufacture and the aluminum allows low cost terminals while the copper allows the capacitor 10 to be soldered on to electrical circuit boards in a customer's factory.

In a typical application, the electroytic capacitor 10 is mounted on circuit boards of a switching regulated power supply system (not shown). As known to those skilled in the art, such a system consists of a full wave rectifier connected in parallel with a first filter capacitor, to a transistor switching circuit. The transistor switch circuit is connected through a series inductance with a second filter capacitor to a direct current load.

The output of the full wave rectifier is filtered by the first filter capacitor and is chopped by the transistor switching circuit into a pulse train. The series inductance and the parallel second filter capacitor integrates the pulse train to provide the D.C. output. The frequency or duty cycle of the switching regulated power supply is varied to maintain the output at the desired level.

The electrolytic capacitor 10 as the second filter capacitor between the series inductance and the load acts as a filter capacitor. It is connected with the input connector leads 38 and 36 respectively connected to the inductance and the transistor switching circuit. The output connector leads 32 and 34 are connected to the load. In this application, the low inductance output out of the output connector leads 32 and 34 provides a substantially constant, low voltage D.C. output while the higher inductance on the input adds to the series inductance to help filter out the undesirable harmonic and ripple components of the output.

The electrolytic capacitor 10 as the first capacitor between the full wave rectifier and the transistor switch circuit is connected with the output connector leads 36 and 38 connected to the rectifier and the input connector leads 32 and 34 connected to the transistor switch circuit. In this application, the capacitor is used to convert the full wave rectified output to a high voltage D.C. output while the higher inductance filters out the high frequency harmonics and ripple from the transistor switch circuit from feeding back into the main power supply which is generally a 60 cycle A.C. source.

To achieve the minimum impedance at the output connector leads 32 and 34, the parallel terminal portions 44 and 46 of the terminal members 40 and 42 as well as the output connector leads 32 and 34 were placed in parallel to neutralize the interaction of electromagnetic fields therebetween and minimize the capacitor output inductance. Basically, this works because the electromagnetic field of any given conductor may be neutralized by passing an equal current in the opposite direction through a second conductor parallel and close to the given conductor.

The above further affords a means for controlling the inductance to a slightly higher level by causing the wires to be nonparallel and diverge by a controlled amount as desired by a particular application. Thus, in the preferred embodiment, the terminal members 40 and 42 are respectively provided with the nonparallel terminal portions 48 and 50.

Further, it has been determined by welding the first and second tabs 24 and 26 to the parallel terminal portions 44 and 46, that it is possible to maintain the flat, terminal proximate portions of the tabs parallel to each other so as to further minimize the inductance, as explained above, between the first and second tabs 24 and 26.

In the past, it was a practice to weld the tabs directly to the bottom portions of the connector leads. This necessitated long enough tabs to allow the header to be pivoted up perpendicular to the capacitor case so that butt welding could take place. In the preferred embodiment, the welds 30 and 31 are made from the sides of the capacitor element 14 to the case-proximate portions of the parallel terminal portions 44 and 46. This allows the first and second tabs 24 and 26 to be of a minimum length because the header 28 does not have to be pivoted up for welding. The Inventor found this change in length, which was initially considered significant to reduce ESL, also resulted in the equivalent series resistance (ESR) being a significantly lower 0.0032 ohms as compared to 0.0039 ohms of a conventional electrolytic capacitor having the same capacitance value of 39,000 microfarads.

An additional advantage of the above arrangement is the possibility of reducing the overall size of the capacitor to increase capacitance to volume ratio by providing the largest capacitance in the smallest volume. Less volume is required for the tabs and the inward extension of the terminal members can be minimized.

By means of the parallel terminal portions 44 and 46, the parallel tab welding of the first and second tabs 24 and 26, and the parallel positioning of the output connector leads 32 and 34, it has been possible to reduce the equivalent series inductance (ESL) to 3.5 nanohenries from the 14 nanohenries in the conventional capacitor. This is an unexpected four fold reduction in ESL.

The header ribs 52 and 54 are formed of header material covering over the case-interior portions of the first and second terminal members 40 and 42. When the header 28 is fully positioned in the capacitor case 12, the header ribs 52 and 54 will indent the capacitor element 14 as it is compressed against the closed end of the capacitor case 12. This indentation of the capacitor element 14 will prevent relative radial as well as axial movement between the capacitor element 14 and the header 28 so as to prevent flexure and subsequent breakage of the first and second tabs 24 and 26.

While the invention has been described in conjunction with the specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

What is claimed is:

1. A capacitor header comprising: a header body; first terminal means carried by said header body and extending therefrom, said first terminal means including a first terminal portion noncoextensive with the remainder of said first terminal means spaced a predetermined distance from and parallel to one side of said header body and extending therefrom, said second terminal means including a second terminal portion spaced substantially said predetermined distance from and parallel to said one side of said header body and to said first terminal portion of said first terminal means, sections of each of said first and second terminal means extending through said header body to form a pair of connecting means on the opposite side of said header body.

2. The capacitor header as claimed in claim 1, wherein said first and second terminal portions are respectively perpendicular to the remainder of said first and second terminal means.

3. The capacitor header as claimed in claim 2 wherein said first and second terminal portions include a nonsolderable conductive material, and said first and second terminal means include first and second connector portions extending from said header body distally from said first and second terminal portions, said first and second connector portions including a solderable conductive material.

4. The capacitor header as claimed in claim 3 wherein said header body includes an extension which substantially covers said first and second terminal portions to respectively define first and second header ribs.

5. The capacitor header as claimed in claim 1 wherein said first and second terminal means include respective third and fourth terminal portions respectively connected to said first and second terminal portions, said third and fourth terminal portions spaced apart and nonparallel.

6. The capacitor header as claimed in claim 5 wherein said first, second, third, and fourth terminal portions include a nonsolderable conductive material, and said first, second, third, and fourth terminal portions respectively have first, second, third, and fourth connector portions connected thereto extending from said header body respectively distally from said first, second, third, and fourth terminal portions, said first, second, third, and fourth connector portions including a solderable conductive material.

7. The capacitor header as claimed in claim 6 wherein said header body includes an extension which substantially covers said first and second terminal portions and entirely covers said third and fourth terminal portions to respectively define first, second, third, and fourth header ribs.

8. For a capacitor including a case open at one end and closed at the other end containing therein a first spacer film, a first electrode film abutting said first spacer film, a second spacer film abutting said first electrode film, a second electrode film abutting said first spacer film, first connecting means extending from said first electrode film towards said open end of said case, and second connecting means extending from said second electrode film towards said open end of said case, a capacitor header comprising: a header body; first and second terminal means partially disposed in and carried by said header body, each of said first and second terminal means respectively including first and second spaced apart and parallel connector portions extending outwardly from one side of said header in a first direction, said first and second terminal means respectively including first and second proximately spaced apart and parallel terminal portions juxtapositioned to extend along an opposite side of said header in a second direction non-coextensive with said first direction and connected to said first and second connector portions; said first and second terminal portions being parallel to said header and spaced from said header by substantially equal distances, respectively; and said first and second connecting means respectively connectable to said first and second spaced apart and parallel terminal portions whereby the inductances of said first connector and terminal portions and said second connector and terminal portions are substantially minimized.

9. The capacitor header as claimed in claim 8 wherein said first and second terminal means respectively include third and fourth spaced apart and parallel connector portions extending outwardly from said header in said first direction, and said first and second terminal means respectively include third and fourth spaced apart and nonparallel terminal portions respectively connecting said third and fourth connector portions to said first and second terminal portions whereby said third and fourth terminal portions have predetermined inductances.

10. The capacitor header as claimed in claim 8 wherein said first and second connecting means respectively include first and second portions, and said first and second portions are disposed in parallel relationship when respectively connected to said first and second terminal portions whereby inductances in said first and second portions of said respective first and second connecting means are substantially minimized.

11. The capacitor header as claimed in claim 8 wherein said first and second connecting means are respectively connected to case-proximate portions of said first and second terminal portions so that extension of said first and second connecting means from said films to said header is minimized whereby said capacitor's equivalent series resistance will be minimized.

12. The capacitor header as claimed in claim 8 wherein said first and second connector portions include a solderable conductive material and said first and second terminal portions include a nonsolderable conductive material.

13. The capacitor header as claimed in claim 8 wherein said first and second terminal portions are extendable into said case from said header and are engageable with said first and second spacer films to prevent movement thereof in said case.

14. The capacitor header as claimed in claim 13 wherein said header includes an extension which substantially covers said first and second terminal portions to define first and second header ribs which are engageable with said first and second spacer films to prevent relative movement between said spacer films and said header.

15. In a capacitor including a case having at one end thereof an access opening, said case containing therein a first spacer film, a first electrode film abutting said first spacer film, a second spacer film abutting said first electrode film, a second electrode film abutting said first spacer film, a first tab abutting said first electrode film and extending from said first electrode film towards said case, and a second tab abutting said second electrode film and extending from said second electrode film towards said case, the improvement comprising: first and second terminal means partially disposed in and carried by said case, said first and second terminal means respectively including first and second spaced apart and parallel connector portions extending outwardly from said case through a plane defining said access opening, said first and second terminal means respectively including first and second proximately spaced apart and parallel terminal portions juxtapositioned in said case and connected to and noncoextensive with said first and second connector portions; said first and second terminal portions being parallel to the plane of said access opening spaced from said plane by substantially equal distances; and said first and second tabs respectively connected to said first and second spaced apart and parallel terminal portions whereby inductances in said first and second connector and first and second terminal portions are minimized.

16. The improvement is claimed in claim 15 wherein said first and second terminal means respectively include third and fourth spaced apart and parallel connector portions extending outwardly from said case, and said first and second terminal means respectively include third and fourth spaced apart and nonparallel terminal portions respectively connecting said third and fourth connector portions to said first and second terminal portions whereby said third and fourth terminal portions have predetermined inductances.

17. The improvement as claimed in claim 15 wherein said first and second tabs respectively include first and second flat portions and said first and second flat portions are disposed in parallel relationship when respectively connected to said first and second terminal portions whereby said first and second flat portions of said respective first and second tabs have minimal inductances.

18. The improvement as claimed in claim 15 wherein said first and second connecting means are respectively connected to case-proximate portions of said first and second terminal portions so that extension of said first and second connecting means from said films to said case is minimized whereby said capacitor's equivalent series resistance is minimized.

19. The improvement as claimed in claim 15 wherein said first and second connector portions include a solderable conductive material and said first and second terminal portions include a nonsolderable conductive material.

20. The improvement as claimed in claim 15 wherein said first and second terminal portions extend into said case and engages said first and second spacer films to prevent movement thereof in said case.

21. The improvement as claimed in claim 20 wherein said case includes an extension which substantially covers said first and second terminal portions to define first and second ribs which are engageable with said first and second spacer films to prevent relative movement between said spacer films and said case.

22. In a capacitor including a cylindrical case open at one end and closed at the other end containing therein a first cylindrically rolled spacer film, a first cylindrically rolled electrode film abutting and encircled by said first cylindrically rolled spacer film, a second cylindrically rolled spacer film abutting and encircled by said second cylindrically rolled spacer film, a first tab abutting said first electrode film and extending from said first electrode film towards said open end of said case, and a second tab abutting said second electrode film and extending from said second electrode film towards said open end of said case, the improvement comprising: a header for closing said open end of said case; first and second terminal members partially disposed in and carried by said header, said first and second terminal members respectively including first and second spaced apart and parallel connector leads extending outwardly of said case from one side of said header, said first and second terminal members respectively having integral therewith first and second proximately spaced part and parallel terminal portions juxtapositioned in said case between said header and said closed end of said case, said first and second terminal portions parallel to and spaced substantially equal distances from an opposite side of said header, said first and second terminal portions disposed perpendicularly to and connected to said first and second connector leads; and first and second tabs respectively connected to said first and second spaced apart and parallel terminal portions whereby inductances in said first connector lead and terminal portion and said second connector lead and terminal portion are substantially minimized.

23. The improvement as claimed in claim 22 wherein said first and second terminal means respectively include third and fourth distally spaced apart and parallel connector leads extending outwardly of said case from said header, and said first and second terminal means respectively include third and fourth spaced apart nonparallel terminal portions disposed perpendicular to said third and fourth connector leads respectively connecting said third and fourth connector leads to said first and second terminal portions whereby said third and fourth terminal portions have predetermined inductances.

24. The improvement as claimed in claim 22 wherein said first and second tabs respectively include first and second flat portions, said first and second flat portions are disposed in parallel relationship outwardly of said first and second terminal members respectively, and said first and second flat portions are respectively connected to said first and second terminal portions whereby said first and second flat portions of said respective first and second tabs have minimal inductances.

25. The improvement as claimed in claim 22 wherein said first and second tabs are respectively welded to case-proximate portions of said first and second terminal portions whereby the length of said first and second tabs from said films to said header is minimized to minimize the equivalent series resistance of said capacitor.

26. The improvement as claimed in claim 22 wherein said first and second connector leads are solderable and said first and second terminal portions are nonsolderable.

27. The improvement as claimed in claim 22 wherein said first and second terminal-portion-proximate portions of said header extend into said case from said header and engage said first and second spacer films to prevent movement thereof in said case.

28. The improvement as claimed in claim 22 wherein portions of said first and second terminal portions are exposed from said header for respective welding of said first and second tabs thereto.

* * * * *